United States Patent
Nan et al.

(10) Patent No.: US 12,085,480 B2
(45) Date of Patent: Sep. 10, 2024

(54) SHALLOW-BURIED LEAKAGE-PROOF PIPELINE AND METHOD FOR OPERATING SAME

(71) Applicant: HENAN POLYTECHNIC UNIVERSITY, Jiaozuo (CN)

(72) Inventors: Hua Nan, Jiaozuo (CN); Jifeng Yuan, Jiaozuo (CN); Shousong Guo, Jiaozuo (CN); Wenlong Shen, Jiaozuo (CN); Faqiang Su, Jiaozuo (CN)

(73) Assignee: HENAN POLYTECHNIC UNIVERSITY, Jiaozuo (CN)

( * ) Notice: Subject to any disclaimer, the term of this patent is extended or adjusted under 35 U.S.C. 154(b) by 254 days.

(21) Appl. No.: 17/741,922

(22) Filed: May 11, 2022

(65) Prior Publication Data

US 2022/0268659 A1     Aug. 25, 2022

Related U.S. Application Data

(63) Continuation of application No. PCT/CN2020/120208, filed on Oct. 10, 2020.

(30) Foreign Application Priority Data

Nov. 29, 2019   (CN) .................. 201911199273.2

(51) Int. Cl.
*G01M 3/18*     (2006.01)
*F17D 5/06*     (2006.01)

(52) U.S. Cl.
CPC .............. *G01M 3/18* (2013.01); *F17D 5/06* (2013.01)

(58) Field of Classification Search
CPC .................................. G01M 3/18; F17D 5/06
See application file for complete search history.

(56) References Cited

FOREIGN PATENT DOCUMENTS

| CN | 105092808 | A |   | 11/2015 |           |
|----|-----------|---|---|---------|-----------|
| CN | 205173743 | U | * | 4/2016  |           |
| CN | 106195647 | A |   | 12/2016 |           |
| CN | 207280708 | U |   | 4/2018  |           |
| CN | 108533884 | A | * | 9/2018  | F16L 55/32 |
| CN | 208011141 | U | * | 10/2018 |           |
| CN | 110748738 | A |   | 2/2020  |           |
| CN | 210920548 | U |   | 7/2020  |           |
| GB | 2320760   | A |   | 7/1998  |           |
| JP | 2008183757| A | * | 8/2008  |           |
| KR | 20160144302| A |  | 12/2016 |           |

* cited by examiner

*Primary Examiner* — Jamel E Williams

(57) ABSTRACT

Disclosed are a shallow-buried leakage-proof pipeline and a method for operating the same. The leakage-proof pipeline includes a programmable logic controller (PLC), an outer pipe, an inner pipe, a first water-pressure sensor, a second water-pressure sensor, an electromagnetic valve, and a movable water leakage detection device. The PLC is arranged on the ground. The outer pipe and the inner pipe are both shallowly buried along a horizontal direction, and the inner pipe is coaxially arranged in the outer pipe. The first water-pressure sensor and the electromagnetic valve are both arranged at a water inlet of the inner pipe, and the second water-pressure sensor is arranged at a water outlet of the inner pipe. The movable water leakage detection device is arranged at a bottom of the outer pipe.

1 Claim, 2 Drawing Sheets

SHALLOW-BURIED LEAKAGE-PROOF PIPELINE AND METHOD FOR OPERATING SAME

CROSS-REFERENCE TO RELATED APPLICATIONS

This application is a continuation of International Patent Application No. PCT/CN2020/120208, filed on Oct. 10, 2020, which claims the benefit of priority from Chinese Patent Application No. 201911199273.2, filed on Nov. 29, 2019. The content of the aforementioned application, including any intervening amendments thereto, is incorporated herein by reference in its entirety.

TECHNICAL FIELD

This application relates to pipeline installation, and more particularly to a shallow-buried leakage-proof pipeline and a method for operating the same.

BACKGROUND

Pipelines are indispensable in the daily transportation. As reported in the "Research report on the Development Status and Prospects of China's plastic pipeline industry in 2019-2024", China's demand for plastic pipelines will still continue to increase at an annual growth rate of about 9% in 2019. At present, most of the liquid-delivering pipelines are subject to complex underground conditions, and thus prone to corrosion. Therefore, the pipeline leakage may occur frequently, which will not only bring a waste of resources, but also cause environmental pollution. In view of the fact that it is impossible to stop and check the leakage from the source in time for most of the pipelines on the market, it is necessary to develop a novel leakage-proof pipeline.

SUMMARY

To overcome the deficiencies in the prior art, this disclosure provides a shallow-buried leakage-proof pipeline and a method for operating the same. In the actual use of the leakage-proof pipeline provided herein, the leakage losses can be prevented in time, and the leakage point can be accurately identified, which is convenient for timely repairing and replacement, thereby saving resources and extending the service life of the pipeline.

The technical solutions of the disclosure are described below.

In a first aspect, the disclosure provides an underground leakage-proof pipeline, comprising:
a programmable logic controller (PLC);
an outer pipe;
an inner pipe;
a first water-pressure sensor;
a second water-pressure sensor;
an electromagnetic valve; and
a movable water leakage detection device
wherein the PLC is arranged on ground; the outer pipe and the inner pipe are both shallowly buried under the ground along a horizontal direction, and the inner pipe is coaxially arranged in the outer pipe; the first water-pressure sensor and the electromagnetic valve are both arranged at a water inlet of the inner pipe, and the second water-pressure sensor is arranged at a water outlet of the inner pipe; the movable water leakage detection device is arranged at a bottom of the outer pipe; the PLC is connected to the first water-pressure sensor, the second water-pressure sensor and the electromagnetic valve respectively through a signal line; and the PLC is connected to the movable water leakage detection device through a control line stored in the outer pipe.

In an embodiment, the movable water leakage detection device comprises a conduit, a housing, a micro humidity sensor and a micro-motor; the pipe is parallel to the outer conduit and is arranged at the bottom of the outer pipe; a top of the pipe is communicated with the bottom of the outer pipe; the housing is arranged in the conduit, and the micro humidity sensor and the micro-motor are both arranged in the housing; the micro humidity sensor is arranged on the micro-motor; a main shaft of the micro-motor is connected to a roller via a gear transmission mechanism, and the roller is configured to roll along the conduit; and the micro humidity sensor and the micro-motor are respectively connected to the PLC through the control line.

In a second aspect, the present disclosure provides a method for operating the underground leakage-proof pipeline, comprising:
allowing water to flow into the inner pipe from the water inlet of the inner pipe and flow out of the inner pipe from the water outlet of the inner pipe, wherein when there is a leakage point in the inner pipe, leaked water flows down along an outer wall of the inner pipe into the outer pipe, and finally flows into the conduit; receiving, by the PLC, a signal that a pressure difference of the first water-pressure sensor is inconsistent with a pressure difference of the second water-pressure sensor; sending a first command signal, by the PLC, to the electromagnetic valve to block the water inlet of the inner pipe to block water from flowing into the inner pipe, and sending a second command signal, by the PLC, to the micro-motor to start the micro-motor, and driving, by the micro-motor, the roller to move in the conduit toward the water outlet of the inner pipe; when the micro humidity sensor detects that there is water leakage in the conduit, transmitting a signal of a leakage point, by the micro humidity sensor, to the PLC; sending a third command signal, by the PLC, to the micro-motor to allow the micro-motor to stop, and determining a location of the leakage point; and performing excavation at ground corresponding to the leakage point to deal with the leakage point on the inner pipe.

In the leakage-proof pipeline provided herein, the inner pipe is configured for delivering water or other liquids, and the outer pipe is configured to collect leaked water leakage and protect the inner pipe during the excavation. The first water-pressure sensor is configured to monitor the inlet pressure of the inner pipe, and the second water-pressure sensor is configured to monitor the outlet pressure of the inner pipe. The electromagnetic valve is configured to cut off the water flow into the inner pipe. The conduit arranged at the bottom of the outer pipe is configured to collect leaked water. The micro-motor is configured to drive the roller to move along the conduit. The micro humidity sensor is configured to detect the leakage and the location where the leakage occurs.

This disclosure provides a pressure difference-humidity detection method and a leakage point detection device to stop the pipeline leakage timely, which can prevent leakage losses and facilitate the repair and replacement of the pipes, thereby saving resources and extending the service life of the pipeline.

DETAILED DESCRIPTION OF EMBODIMENTS

The technical solutions of the present application will be clearly and completely described below with reference to the drawings of the embodiments. Obviously, described below are only some embodiments of the present application, which are not intended to limit the application. Based on the embodiments provided herein, other embodiments obtained by those skilled in the art without paying any creative effort shall fall within the scope of this application.

Figure 1:
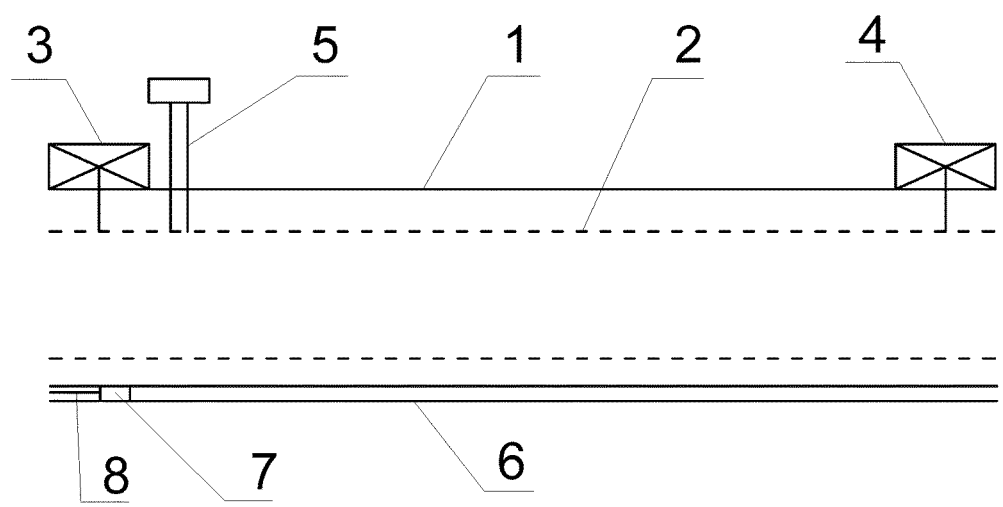
FIG. 1 schematically illustrates an underground leakage-proof pipeline according to an embodiment of the present disclosure.
Figure 2:
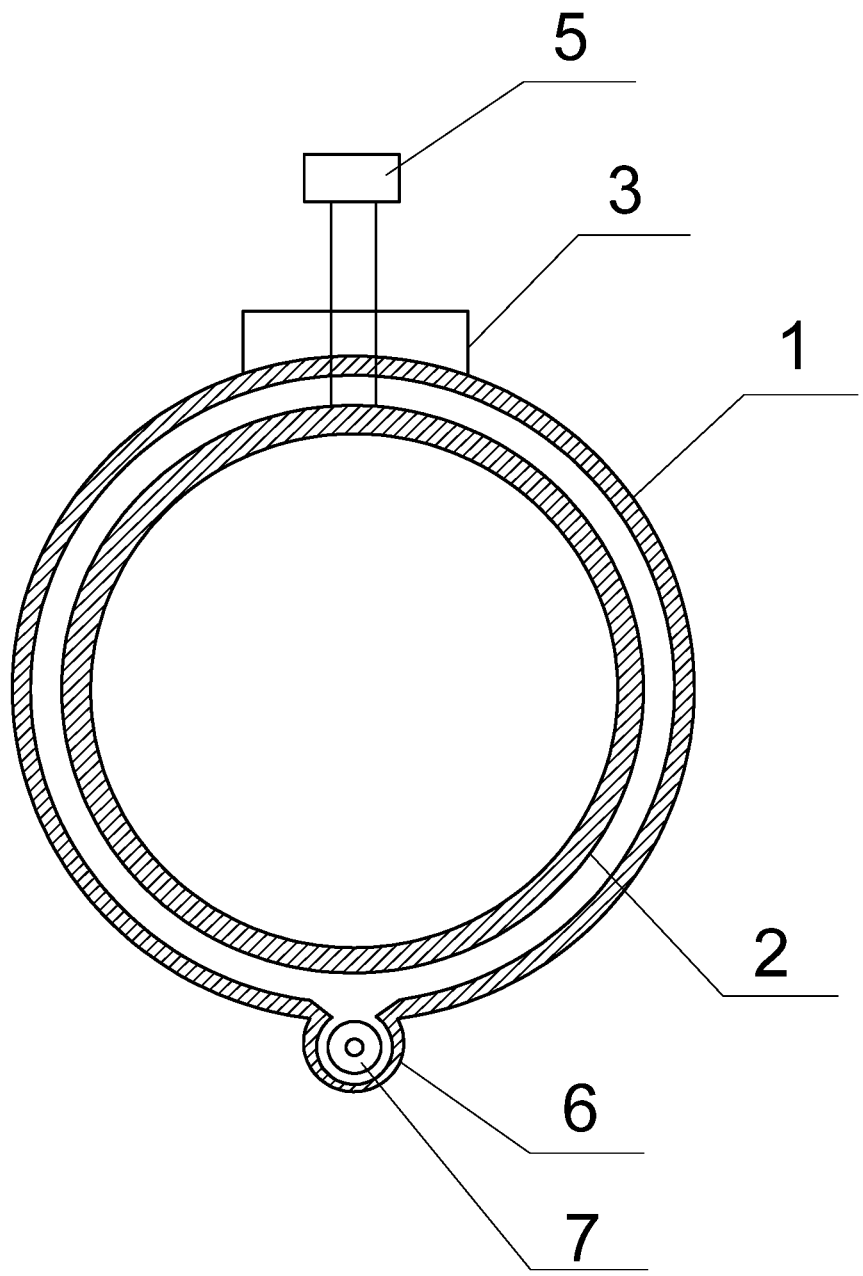
FIG. 2 is a cross-sectional view of the leakage-proof pipeline in FIG. 1 at a water inlet.

As shown in FIGS. 1-2, provided herein is an underground leakage-proof pipeline, which includes a programmable logic controller (PLC), an outer pipe 1, an inner pipe 2, a first water-pressure sensor 3, a second water-pressure sensor 4, an electromagnetic valve 5, and a movable water leakage detection device. The PLC is arranged on ground. The outer pipe 1 and the inner pipe 2 are both shallowly buried under the ground along a horizontal direction, and the inner pipe 2 is coaxially arranged in the outer pipe 1. The first water-pressure sensor 3 and the electromagnetic valve 5 are both arranged at a water inlet of the inner pipe 2, and the second water-pressure sensor 4 is arranged at a water outlet of the inner pipe 2. The movable water leakage detection device is arranged at a bottom of the outer pipe 1. The PLC is connected to the first water-pressure sensor 3, the second water-pressure sensor 4 and the electromagnetic valve 5 respectively through a signal line. The PLC is connected to the movable water leakage detection device through the control line stored in the outer pipe 1.

The movable water leakage detection device includes a conduit 6, a housing 7, a micro humidity sensor and a micro-motor. The conduit 6 is parallel to the outer pipe 1 and is arranged at the bottom of the outer pipe 1. The top of the pipe 6 is communicated with the bottom of the outer pipe 1. The housing 7 is arranged in the conduit 6, and the micro humidity sensor and the micro-motor are both arranged in the housing 7. The micro humidity sensor is arranged on the micro-motor. The main shaft of the micro-motor is connected to a roller via a gear transmission mechanism, and the roller is configured to roll along the conduit 6. The micro humidity sensor and the micro-motor are respectively connected to the PLC through the control line 8.

Provided herein is a method for operating the underground leakage-proof pipeline, which is specifically described as follows.

Water flows in the water inlet of the inner pipe 2 and flows out of the inner pipe 2 from the water outlet of the inner pipe 2. When there is a leakage point in the inner pipe 2, the leaked water will flow down along the outer wall of the inner pipe 2 into the outer pipe 1, and finally flows into the conduit 6. At this time, the PLC receives the signal that the pressure difference of the first water-pressure sensor 3 is inconsistent with the pressure difference of the second water-pressure sensor 4, and sends a first command signal to the electromagnetic valve 5 to block the water inlet of the inner pipe 2 to block water from flowing into the inner pipe 2. In the meanwhile, the PLC sends a second command signal to the micro-motor to start the micro-motor starts. The roller is driven by the micro-motor to move in the conduit 6 toward the water outlet of the inner pipe. When the micro humidity sensor detects that there is water leakage in the conduit, it transmits the signal of the leakage point to the PLC. As a response, the PLC sends a third command signal to the micro-motor to allow the micro-motor to stop, and determine the location of the leakage point. Subsequently, excavation at ground corresponding to the leakage point is performed to deal with the leakage point on the inner pipe 2.

In the underground leakage-proof pipeline provided herein, the inner pipe 2 is configured for delivering water or other liquids, and the outer pipe is configured to collect water leakage and protect the inner pipe 2 during excavation. The first water-pressure sensor 3 is configured to monitor the inlet water-pressure of the inner pipe 2, and the second water-pressure sensor 4 is configured to monitor the outlet water-pressure of the inner pipe 2. The electromagnetic valve 5 is configured to block the water inlet. The conduit 6 arranged at the bottom of the outer pipe is configured to collect water leakage. The micro-motor is configured to drive the roller to move along the conduit 6. The micro humidity sensor is configured to detect leakage and location thereat.

The above-mentioned embodiments are merely illustrative of the technical solutions of the present disclosure, and are not intended to limit the present disclosure. Although the present disclosure has been described in detail with reference to the aforementioned embodiments, it should be understood by one of ordinary skill in the art that some modifications and equivalent replacements can still be made to the technical solutions provided herein. Those modifications or replacements made by those skilled in the art without departing from the spirit and scope of the disclosure shall fall within the scope of the disclosure defined by the appended claims.

What is claimed is:

1. An underground leakage-proof pipeline, comprising:
a programmable logic controller (PLC);
an outer pipe;
an inner pipe;
a first water-pressure sensor;
a second water-pressure sensor;
an electromagnetic valve; and
a movable water leakage detection device;
wherein the PLC is arranged on ground; the outer pipe and the inner pipe are both shallowly buried under the ground along a horizontal direction, and the inner pipe is coaxially arranged in the outer pipe; the first water-pressure sensor and the electromagnetic valve are both arranged at a water inlet of the inner pipe, and the second water-pressure sensor is arranged at a water outlet of the inner pipe; the movable water leakage detection device is arranged at a bottom of the outer pipe; the PLC is connected to the first water-pressure sensor, the second water-pressure sensor and the electromagnetic valve respectively through a signal line; and the PLC is connected to the movable water leakage detection device through a control line stored in the outer pipe;
wherein the movable water leakage detection device comprises a conduit, a housing, a micro humidity sensor and a micro-motor; the conduit is parallel to the outer pipe, and is arranged at the bottom of the outer pipe; a top of the conduit is communicated with the bottom of the outer pipe; the housing is arranged in the conduit, and the micro humidity sensor and the micro-motor are both arranged in the housing; the micro humidity sensor is arranged on the micro-motor; a main shaft of the micro-motor is connected to a roller via a gear transmission mechanism, and the roller is configured to roll along the conduit; and the micro humidity sensor and the micro-motor are respectively connected to the PLC through the control line.

\* \* \* \* \*